(12) United States Patent
Martinson

(10) Patent No.: US 6,715,893 B2
(45) Date of Patent: Apr. 6, 2004

(54) LATERAL-VIEW MIRROR ASSEMBLY FOR A VEHICLE

(76) Inventor: Lowell Martinson, 16455 S. 15th St., Phoenix, AZ (US) 85048

( * ) Notice: Subject to any disclaimer, the term of this patent is extended or adjusted under 35 U.S.C. 154(b) by 23 days.

(21) Appl. No.: 10/264,184

(22) Filed: Oct. 3, 2002

(65) Prior Publication Data

US 2003/0063399 A1 Apr. 3, 2003

Related U.S. Application Data

(63) Continuation-in-part of application No. 09/875,212, filed on Jun. 7, 2001, and a continuation-in-part of application No. 10/216,683, filed on Aug. 12, 2002.

(51) Int. Cl.⁷ .......................... G02B 5/08; G02B 5/10; G02B 7/182; B60R 1/06; B60R 1/08
(52) U.S. Cl. .................. 359/855; 359/857; 359/862; 359/863; 359/865; 359/872; 359/877; 359/900
(58) Field of Search .................. 359/850, 855, 359/856, 857, 858, 861, 862, 863, 865, 872, 877, 900

(56) References Cited

U.S. PATENT DOCUMENTS 5,424,875 A  * 6/1995 Davis, II 5,666,227 A  * 9/1997 Ben-Ghiath

FOREIGN PATENT DOCUMENTS

| DE | 1803363 | * | 6/1970 |
| DE | 2600223 | * | 7/1977 |
| DE | 3023208 | * | 3/1982 |
| DE | 3122948 | * | 12/1982 |
| JP | 0143156 | * | 7/1985 |
| NL | 6407141 | * | 12/1964 |

* cited by examiner

Primary Examiner—Ricky D. Shafer
(74) Attorney, Agent, or Firm—Craig Weiss; Jeffrey Weiss; Weiss, Moy & Harris, P.C.

(57) ABSTRACT

A lateral-view mirror assembly capable of providing a driver of a vehicle with the ability to view objects positioned lateral to a rear portion of the vehicle by looking at a reflection of the objects reflected from lateral-view mirrors to a rear-view mirror to the driver. The two lateral-view mirrors are placed apart on a rear portion of a vehicle, with a first lateral-view mirror placed between a center portion and a driver's side of a top surface of a rear portion of a vehicle and a second lateral-view mirror placed between a center portion and a passenger's side of a top surface of a rear portion of a vehicle.

19 Claims, 3 Drawing Sheets

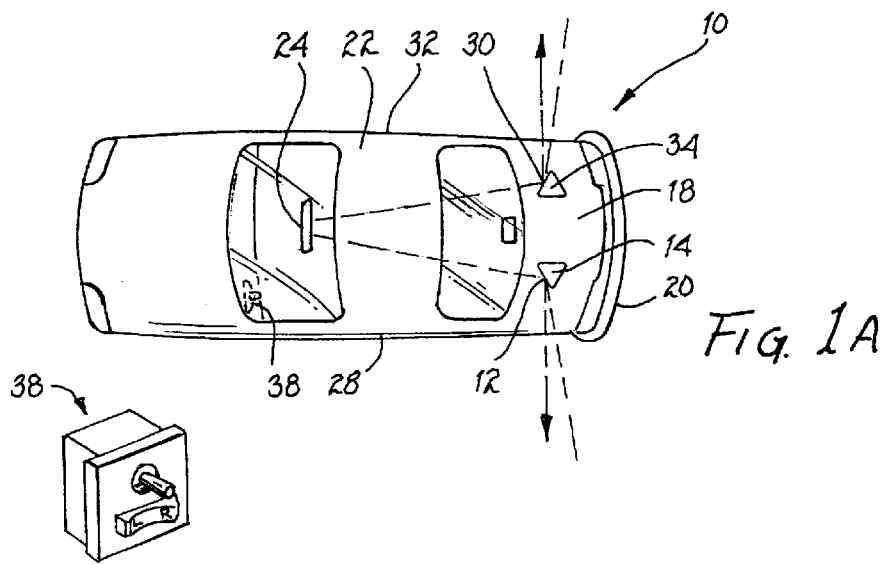
FIG. 1A
FIG. 1B
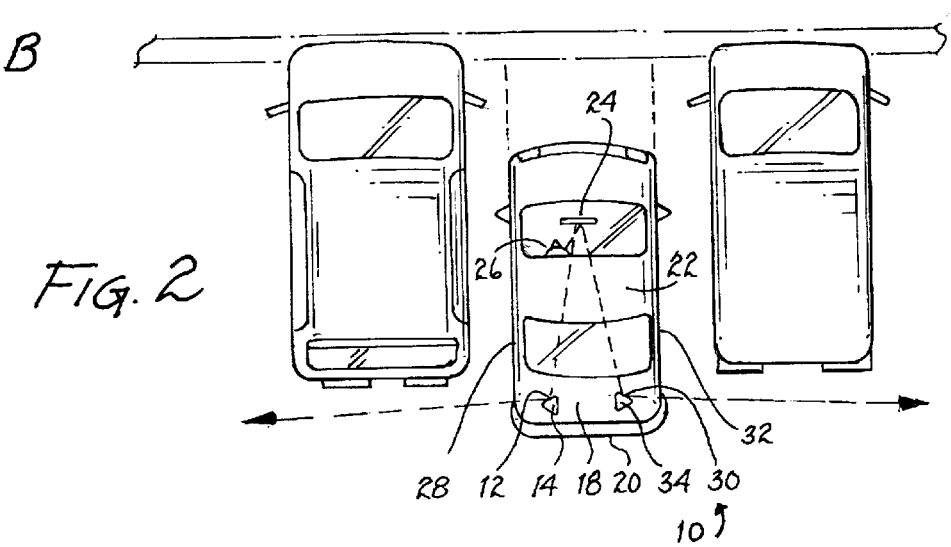
FIG. 2
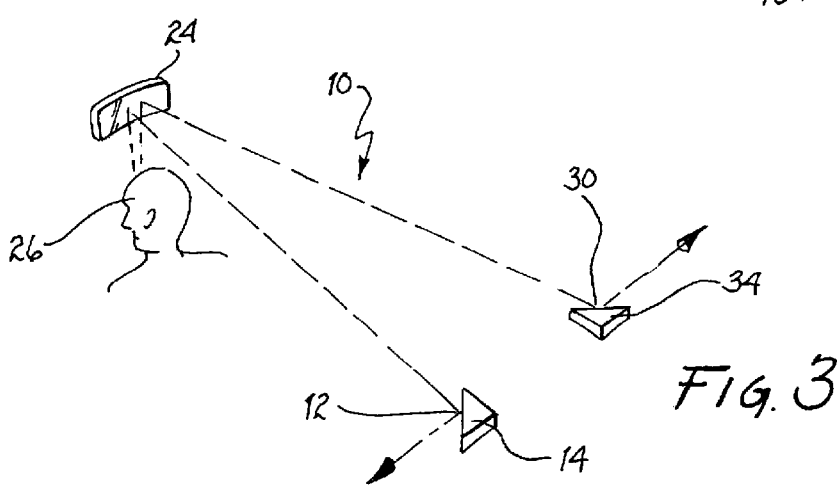
FIG. 3

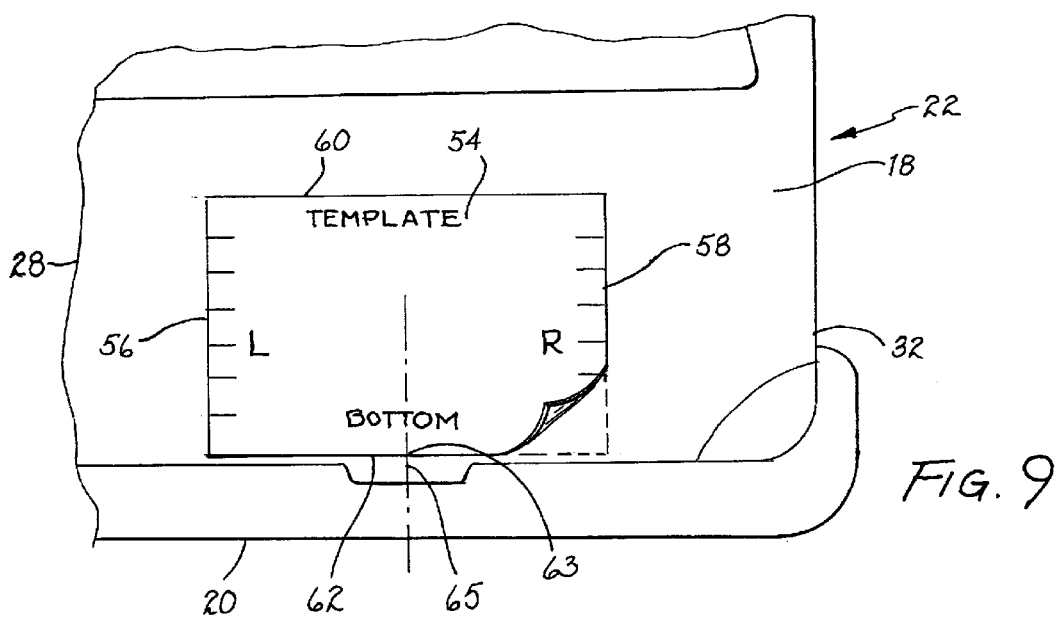
FIG. 9
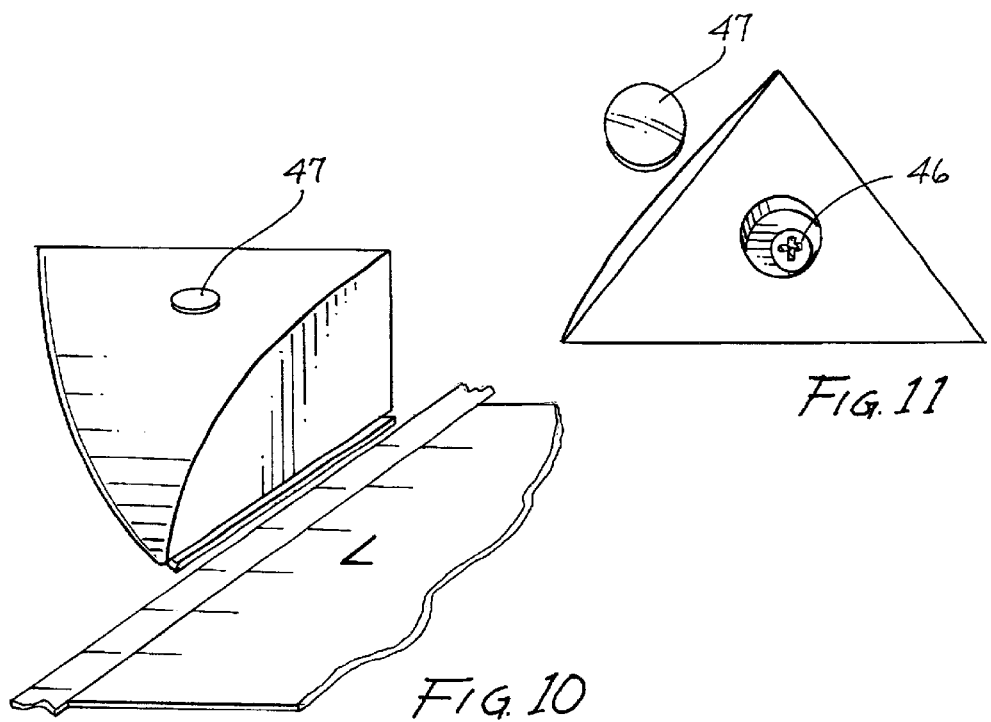
FIG. 10
FIG. 11

LATERAL-VIEW MIRROR ASSEMBLY FOR A VEHICLE

CROSS-REFERENCE TO RELATED APPLICATIONS

This is a continuation-in-part of U.S. patent application Ser. No. 09/875,212 filed Jun. 7, 2001 and U.S. patent application Ser. No. 10/216,683 filed Aug. 12, 2002 in the name of the Applicant, to which priority is claimed.

FIELD OF THE INVENTION

This invention relates generally to mirrors for vehicles designed to aid a driver in identifying objects and, more specifically, to a trunk-mounted lateral-view mirror assembly for a vehicle dimensioned to allow a driver to view objects positioned lateral to a rear portion of the vehicle.

BACKGROUND OF THE INVENTION

Driving a car or other vehicle safely requires the driver to constantly be able to see other vehicles, objects and pedestrians. This is often difficult since a car has many blindspots, and the driver generally is facing forward with limited ability to turn around and view surrounding areas. One situation where a driver's limited field of vision presents an especially acute problem is when pulling out of a parking spot. When a driver needs to back out of a parking space in which he or she is parked face-forward between two other vehicles, especially when those vehicles are large in size, the driver has no ability to see laterally to either side of the rear portion of his or her vehicle to determine if there are pedestrians or other vehicles about to cross into his or her path. Often, most drivers in this situation simply back out slowly in an attempt to alert pedestrians and other cars of the vehicle's presence. This method is fraught with danger. It is often the case that pedestrians walking through a parking lot simply do not see a car as it backs out. The same is the case for another vehicle or a bike which might be passing quickly behind the driver's vehicle as he or she backs out. In all of these cases, it is the parked vehicle's driver who is responsible for insuring that his or her car does not strike a pedestrian or vehicle. In order to be sure that a pedestrian or vehicle is not approaching, the driver must be able to see laterally from a rear portion of the driver's vehicle in order to see if a pedestrian or vehicle is approaching.

Various attempts have been made to use mirrors to allow a driver to view objects lateral to a rear end of a vehicle. For example, Netherlands patent 6,407,141 issued to Lorenzo shows one embodiment with mirrors placed at opposite corners of a rear end of a vehicle. This design prevents the use of the relatively large rear-view mirror in order to view the lateral-view mirrors, instead relying on the relatively small side-view mirrors to relay images from the relatively small lateral-view mirrors. This set-up is also counterintuitive to most drivers. When backing up in a vehicle, a driver is often already conditioned to look through the rear-view mirror to see if there are any obstructions directly behind the vehicle.

Another embodiment of the Lorenzo patent discloses a substantially Y-shaped mirror assembly placed at the center of a top surface of a rear end of a vehicle. Although this mirror assembly does utilize the rear-view mirror, there are several problems with the design. Most automobiles today are required to have a rear brake light mounted proximate a bottom center portion of the rear windshield. A Y-shaped mirror assembly can only be placed at a center portion of the trunk of a vehicle, thus obstructing other drivers' ability to view the rear windshield mounted brake light. Additionally, it would be difficult for a driver to see over his or her rear windshield mounted brake light to see the trunk-mounted mirrors placed directly behind the brake light.

German patent DE 3023-208 issued to Scheffler also shows several embodiments of mirror assemblies for lateralview. In one embodiment, a triangular-shaped mirror assembly is placed at the center portion of the trunk of a vehicle, which, as discussed above, both obstructs the view of the rear windshield mounted brake light and obstructs the driver's ability to see the mirror assembly through the rear-view mirror. In another embodiment of the Scheffler patent, separate mirrors are placed at the rear corners of the vehicle. As mentioned above, this design does not utilize the relatively large rear-view mirror, and is counter-intuitive to most drivers.

A need therefore existed for a lateral-view mirror assembly having two lateral-view mirrors placed apart on a rear portion of a vehicle, with a first lateral-view mirror placed between a center portion and a driver's side of a top surface of a rear portion of a vehicle and a second lateral-view mirror placed between a center portion and a passenger's side of a top surface of a rear portion of a vehicle.

SUMMARY OF THE INVENTION

An object of the present invention is to provide a lateralview mirror assembly for a vehicle capable of providing two lateral-view mirrors coupled to a top surface of a rear portion of a vehicle and dimensioned to allow a driver to view objects positioned lateral to a rear portion of the vehicle by looking at a reflection of objects through the lateral-view mirror to a rear-view mirror to the driver.

It is a further object of the present invention to provide a method for viewing objects lateral to a rear portion of a vehicle capable of allowing a driver to view objects positioned lateral to a rear portion of a vehicle by looking at a reflection of objects through two lateral-view mirrors placed on a top surface of a rear portion of a vehicle to a rear-view mirror to the driver.

BRIEF DESCRIPTION OF THE PREFERRED EMBODIMENTS

In accordance with one embodiment of the present invention, a lateral-view mirror assembly for a vehicle is disclosed, comprising, in combination, a first lateral-view mirror coupled to a base portion, the base portion being coupled to a gripping portion, wherein the gripping portion of the first lateral-view convex mirror being adapted to be coupled to a top surface of a rear portion of a vehicle between a center portion of the top surface and a driver's side of the top surface, wherein the first lateral-view mirror being dimensioned to be positioned in a line of sight with a rear-view mirror, the first lateral-view mirror being dimensioned to allow a driver to view objects positioned lateral to the driver's side of a rear portion of the vehicle by looking at a reflection of the objects reflected from the first lateralview mirror to the rear-view mirror to the driver, and a second lateral-view mirror coupled to a base portion, the base portion being coupled to a gripping portion, wherein the gripping portion of the second lateral-view convex mirror being adapted to be coupled to a top surface of a rear portion of the vehicle between a center portion of the top surface and a passenger's side of the top surface, wherein the second lateral-view mirror being positioned in a line of sight with the rear-view mirror, the second lateral-view mirror being dimensioned to allow a driver to view objects positioned lateral to a passenger's side of a rear portion of the vehicle by looking at a reflection of the objects reflected from the second lateral-view mirror to the rear-view mirror to the driver.

In accordance with another embodiment of the present invention, a method for viewing objects lateral to a rear portion of a vehicle is disclosed comprising, in combination, the steps of providing a first lateral-view mirror coupled to a base portion, the base portion being coupled to a gripping portion, coupling the gripping portion of the first lateral-view mirror to a top surface of a rear portion of a vehicle between a center portion of the top surface and a driver's side of the top surface, wherein the first lateral-view mirror being dimensioned to be positioned in a line of sight with a rear-view mirror, the first lateral-view mirror being dimensioned to allow a driver to view objects positioned lateral to the driver's side of a rear portion of the vehicle by looking at a reflection of the objects reflected from the first lateral-view mirror to the rear-view mirror to the driver, providing a second lateral-view mirror coupled to a base portion, the base portion being coupled to a gripping portion, and coupling the gripping portion of the second lateral-view mirror to a top surface of a rear portion of the vehicle between a center portion of the top surface and a passenger's side of the top surface, wherein the second lateral-view mirror being positioned in a line of sight with the rear-view mirror, the second lateral-view mirror being dimensioned to allow a driver to view objects positioned lateral to a passenger's side of a rear portion of the vehicle by looking at a reflection of the objects reflected from the second lateral-view mirror to the rear-view mirror to the driver.

The foregoing and other objects, features, and advantages of the invention will be apparent from the following, more particular description of the preferred embodiments of the invention, as illustrated in the accompanying drawings.

BRIEF DESCRIPTION OF THE DRAWINGS

FIG. 1A is a top view of the preferred embodiment of the lateral-view mirror assembly of the present invention, showing a first lateral view mirror coupled to a top surface of a rear portion of a vehicle between a center portion of the top surface and a driver's side of the vehicle and a second lateral-view mirror coupled to a top surface of a rear portion of a vehicle between a center portion of the top surface and a passenger's side of the vehicle.

FIG. 1B is a perspective view of the remote control used to transmit an actuation signal in order to rotate the lateral-view mirrors in the preferred embodiment of the present invention.

FIG. 2 is a top view of the lateral-view mirror assembly of FIG. 1A, showing a driver of a vehicle using the lateral-view mirror assembly to back out of a parking spot with cars parked on both sides of the driver.

FIG. 3 is a perspective view of the lateral-view mirror assembly of the present invention.

FIG. 9 is a top view of one embodiment of the present invention showing a template used to position the lateral-view mirrors on the top surface of a rear portion of a vehicle.

FIG. 10 is a perspective view of the template of FIG. 9, showing a lateral-view mirror placed proximate the template.

FIG. 11 is a top view of the base of the lateral-view mirror of the present invention, showing a recessed portion of a top portion of the base having a screw used to couple the base portion to the gripping portion and a cap used to conceal the recessed portion.

DETAILED DESCRIPTION OF THE PREFERRED EMBODIMENTS

Referring to FIGS. 1A and 2–3, reference number 10 refers generally to the preferred embodiment of the lateral-view mirror assembly for a vehicle of the present invention. The lateral-view mirror assembly 10 comprises a first lateral-view mirror 12.

Figure 4:
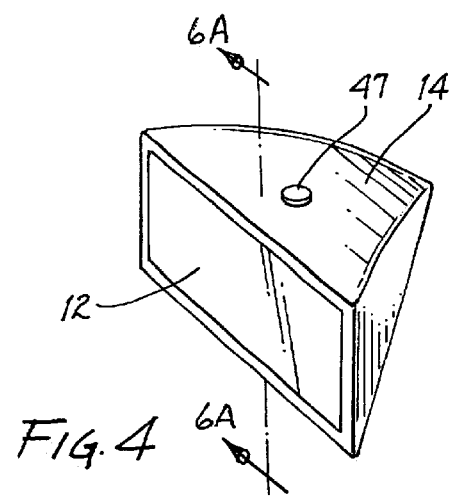
FIG. 4 is a perspective view of the preferred embodiment of the lateral-view mirror of the present invention.
Figure 6B:
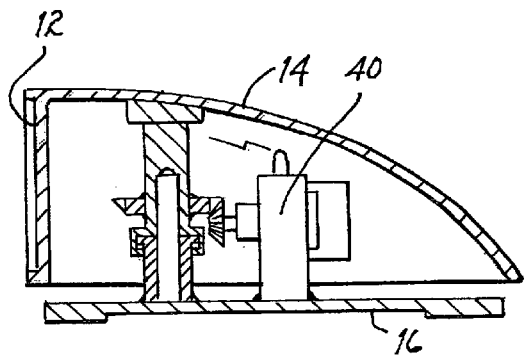
FIG. 6B is a cross-sectional view of the preferred embodiment of the lateral-view mirror of the present invention, showing an actuation device used to rotate the lateral-view mirror.
Figure 6A:
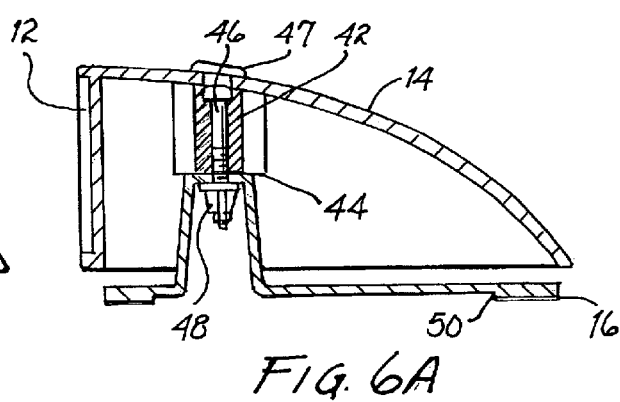
FIG. 6A is a cross-sectional view of the lateral-view mirror of FIG. 4, taken along line 6A—6A.

Referring now to FIGS. 4 and 6, the first lateral-view mirror 12 is coupled to a base portion 14. The base portion 14 is coupled to a gripping portion 16 that is adapted to be coupled to a top surface 18 (shown in FIGS. 1A, 2, and 9) of a rear portion 20 (shown in FIGS. 1A, 2, and 9) of a vehicle 22 (shown in FIGS. 1A, 2 and 9). The first lateral-view mirror 12 is dimensioned to be coupled between a center portion of the top surface 18 of the rear end 20 of the vehicle 22 and the driver's side 28 of the top surface 18 of the vehicle 22.

Referring now to FIGS. 1A and 2–3, the first lateral-view mirror 12 is dimensioned to be positioned in a line of sight with a rear-view mirror 24. The first lateral-view mirror 12 is dimensioned to allow a driver 26 (shown in FIGS. 2–3) to view objects positioned lateral to the driver's side 28 of a rear portion 20 of the vehicle 22 by looking at a reflection of the objects reflected from the first lateral-view mirror 12 to the rear-view mirror 24 to the driver 26.

Figure 8:
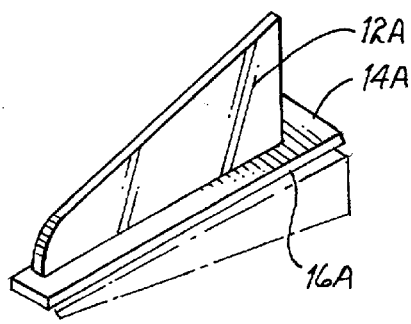
FIG. 8 is an alternative embodiment of the lateral-view mirror of the present invention, showing a non-adjustable lateral-view mirror.

Referring now to FIG. 8, an alternative embodiment of the lateral-view mirror 12, hereinafter 12A, is shown. The lateral-view mirror 12A is coupled to a substantially flat base portion 14A, having a gripping portion 16A on a bottom surface of the base portion 14A.

Referring now to FIGS. 1A and 2–3, the lateral-view mirror assembly 10 further comprises a second lateral-view mirror 30. The second lateral-view mirror 30 is essentially the same as the first lateral-view mirror 12, except that the second lateral-view mirror 30 is dimensioned to be coupled between a center portion of the top surface 18 of the rear end 20 of the vehicle 22 and the passenger's side 32 of the top surface 18 of the vehicle 22.

Figure 5:
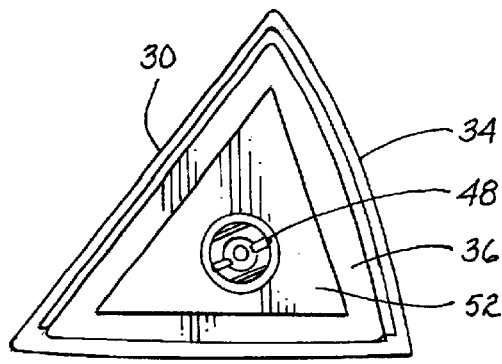
FIG. 5 is a bottom view of the lateral-view mirror of the present invention.

Referring now to FIG. 5, the second lateral-view mirror 30 is coupled to a base portion 34 having a gripping portion 36 dimensioned to be coupled to a top surface 18 of a rear portion 20 of a vehicle 22. In the preferred embodiment, a first adhesive 50 (shown in FIG. 6A) is coupled to a bottom portion of the gripping portion 16 of the first lateral-view mirror 12. The first adhesive 50 is dimensioned to be coupled to the top surface 18 of the rear portion 20 of the vehicle 22. Preferably, a second adhesive 52 (shown in FIG.

5) is coupled to a bottom portion of the gripping portion 36 of the second lateral-view mirror 30. The second adhesive 52 is also dimensioned to be coupled to the top surface 18 of the rear portion 20 of the vehicle 22. While, in the preferred embodiment, the lateral-view mirror assembly 10 comprises a first adhesive 50 and a second adhesive 52 used to couple the gripping portions 16 and 36, respectively, to the top surface 18 of the rear portion 20 of the vehicle 22, it should be clearly understood that substantial benefit could be derived from an alternative coupling means, such as by coupling the base portions 14 and 32 to the top surface 18 of the rear portion 20 of the vehicle 22 during a manufacturing stage, so long as the first lateral-view mirror 12 and the second lateral-view mirror 30 are capable of resting securely on the top surface 18 of the rear portion 20 of the vehicle 22.

The second lateral-view mirror 30 is also dimensioned to be positioned in a line of sight with a rear-view mirror 24. The second lateral-view mirror 30 is dimensioned to allow a driver 26 (shown in FIGS. 2–3) to view objects positioned lateral to the passenger's side 32 of a rear portion 20 of the vehicle 22 by looking at a reflection of the objects reflected from the second lateral-view mirror 30 to the rear-view mirror 24 to the driver 26.

Referring now to FIGS. 5, 6A, 6B and 11, the base portion 14 of the first lateral-view mirror 12 preferably defines a bore 42 (shown in FIG. 6A) therethrough and the gripping portion 16 of the first lateral-view mirror 12 preferably defines a bore 44 (shown in FIG. 6A) therethrough. Preferably, a screw 46 (shown in FIGS. 6A and 11) and wing-nut assembly 48 (shown in FIGS. 5 and 6A) are used to couple the gripping portion 16 to the base portion 14 of the first lateral-view mirror 12 through bore 42 and bore 44. A similar coupling arrangement for the base portion 34 and the gripping portion 36 of the second lateral-view mirror 30 is also envisioned (shown in FIG. 5). Preferably, a lid 47 (shown in FIGS. 4, 6A, 10 and 11) is used to close bore 42 so as to keep dirt, rain and other unwanted debris from entering the base portion, although it should be clearly understood that substantial benefit could be derived from an alternative embodiment of the lateral-view mirror assembly 10 in which no lid 47 is used. While, in the preferred embodiment, bores 42 and 44 are used with the screw 46 and wing-nut assembly 48 to couple the gripping portion 16 to the base portion 14 (and the gripping portion 36 to the base portion 34), it should be clearly understood that substantial benefit could be derived from an alternative configuration of the lateral-view mirror assembly 10 that uses some other means for coupling, such as an integral coupling found in a one-piece assembly, so long as the base portion 14 and the gripping portion 16 are securely coupled together.

In the preferred embodiment, the first lateral-view mirror 12 and the second lateral-view mirror 30 are convex and have a substantially 40 inch radius of curvature, although it should be understood that substantial benefit could be derived from an alternative configuration of the lateral-view mirror assembly 10 in which the first lateral-view mirror 12 and the second lateral-view mirror 30 are not convex or in which the radius of curvature deviates, even substantially from the preferred radius of curvature in either direction.

In the preferred embodiment, the base portion 14 of the first lateral-view mirror 12 is rotatable relative to the gripping portion 16 of the first lateral-view mirror 12. Also preferably, the base portion 34 of the second lateral-view mirror 30 is rotatable relative to the gripping portion 36 of the second lateral-view mirror 30. In the preferred embodiment, the base portion 14 and the base portion 34 are rotatable both horizontally and vertically relative to their respective gripping portions 16 and 36 in order to enable a user to adjust the first lateral-view mirror 12 and the second lateral-view mirror 30 after the first lateral-view mirror 12 and the second lateral-view mirror 30 have already been coupled to the top surface 18 of the rear portion 20 of the vehicle 22. However, it should be clear that substantial benefit could be derived from an alternative configuration of the lateral-view mirror assembly 10 in which the first lateral-view mirror 12 and the second lateral view mirror 30 are not rotatable both horizontally and vertically or not rotatable at all.

Figure 7:
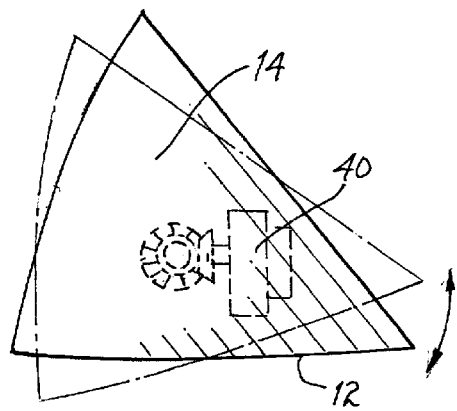
FIG. 7 is a top view of the lateral-view mirror of FIG. 6B, showing the actuation device rotating the lateral-view mirror.

Referring now to FIGS. 1A and 1B, in the preferred embodiment, the lateral-view mirror assembly 10 further comprises a remote control 38 coupled to an interior portion of the vehicle 22 proximate a driver's side 28 of the vehicle 22. The lateral-view mirror assembly 10 preferably further comprises at least one actuation device 40 (shown in FIGS. 6B and 7) coupled to the base portion of at least one and preferably both the first lateral-view mirror 12 and the second lateral-view mirror 30. The at least one actuation device 40 is dimensioned to rotate the at least one lateral-view mirror relative to the gripping portion of the at least one lateral-view mirror when the remote control 38 transmits an actuation signal to the at least one actuation device 40. While, in the preferred embodiment, the lateral-view mirror assembly 10 comprises a remote control 38 and at least one actuation device 40, it should be clearly understood that substantial benefit could be derived from an alternative embodiment of the lateral-view mirror assembly 10 in which there is no remote control 38 or no actuation device 40.

In one embodiment of the present invention, the gripping portion 16 of the first lateral-view mirror 12 and the gripping portion 36 of the second lateral-view mirror 30 are coupled to the top surface 18 of the rear portion 20 of the vehicle 22 during a manufacturing stage of the vehicle 22.

Referring now to FIGS. 9–10, the lateral-view mirror assembly 10 preferably further comprises a substantially rectangular template 54 dimensioned to be placed on the top surface 18 of the rear portion 20 of the vehicle 22. The template 54 is used as an aid to mounting the lateral-view mirrors onto the top surface 18 of the rear portion 20 of the vehicle 22. The template 54 has a first side 56, a second side 58, a top side 60 and a bottom side 62. The bottom side 62 of the template 54 is proximate the rear portion 20 of the vehicle 22, with a center portion 63 of the bottom side 62 of the template 54 proximate a rear center portion 65 of the rear portion 20 of the vehicle 22 (as shown in FIG. 9). The first side 56 of the template 54 is between a rear center portion 65 of the top surface 18 of the rear portion 20 of the vehicle 22 and a driver's side 28 of the top surface 18 of the rear portion 20 of the vehicle 22 so that the first lateral-view mirror 12 can be placed proximate the first side 56 of the template 54 and be in a line of sight with the rear-view mirror 24. The second side 58 of the template 54 is between a center portion 65 of the top surface 18 of the rear portion 20 of the vehicle 22 and a passenger's side 32 of the top surface 18 of the rear portion 20 of the vehicle 22 so that the second lateral-view mirror 30 can be placed proximate the second side 58 of the template 54 and be in a line of sight with the rear-view mirror 24. Preferably, the distance between the first side 56 and the second side 58 of the template 54 is in a range of approximately 16–22 inches and the distance between the top end 60 and the bottom end 62 of the template 54 is in a range of approximately 10–18 inches, although it should be clearly understood that substantial benefit could be derived from an alternative embodiment of the lateral-view mirror assembly in which the dimensions of the template deviate, even substantially from the preferred dimensions, in either direction. While, in the preferred embodiment, the lateral-view mirror assembly 10 comprises a template 54 to assist a person in placing the lateral-view mirrors, it should be clearly understood that substantial benefit could be derived from an alternative embodiment of the lateral-view mirror assembly 10 in which there is no template 54, or in which some other means exist, such as string, to assist a person in placing the lateral-view mirrors.

Statement of Operation

In order to use the lateral-view mirror assembly 10, a user preferably couples the base portions 14 and 34 to their respective gripping portions 16 and 36, although this step may not be necessary if the base portions 14 and 34 are coupled to their respective gripping portions 16 and 36 at a manufacturing stage. Preferably, the template 54 is then placed on the top surface 18 of the rear portion 20 of the vehicle 22, with a center portion 65 of the bottom side 62 of the template 54 proximate a rear center portion 65 of the rear portion 20 of the top surface 20 of the vehicle 22. The center area of the rear portion 200 or trunk of a vehicle 22 is usually marked on most vehicles by an emblem, or key entry for opening the trunk.

Next, the user will preferably place the first lateral-view mirror 12 proximate the first side 56 of the template 54. The user may choose to place the first lateral-view mirror at alternative points located along the first side 54 (marked by dashes shown in FIGS. 9–10) in order to find a location that is most suitable. The location should allow the first lateral-view mirror 12 to be in a line of sight with the rear-view mirror 24 while at the same time, capable of conveying images of objects lateral to the rear portion 20 of the vehicle 22 to the rear-view mirror 24 and, subsequently, to the driver 26. In order to achieve this effect, it may be necessary to rotate the base portion 14 relative to the gripping portion 16 in order for the first lateral-view mirror 12 to be in the correct position. This process is repeated for the second lateral-view mirror 30. Preferably, once the location is chosen, the user can then remove a protective covering from the adhesives and then secure the first lateral-view mirror 12 and the second lateral-view mirror 30 to the top surface 18 of the rear portion 20 of the vehicle 22. The template 54 is then removed. If further adjustment is needed, due to a second driver's height, seat position or other factors, the base portions 14 and 34 of their respective lateral-view mirrors 12 and 30 can preferably be rotated relative to their respective gripping portions 16 and 36, preferably in both a horizontal and vertical direction, either manually or, preferably, by a remote-controlled 38 actuation device 40.

While the invention has been particularly shown and described with reference to preferred embodiments thereof, it will be understood by those skilled in the art that the foregoing and other changes in form and details may be made therein without departing from the spirit and scope of the invention.

I claim:

1. A lateral-view mirror assembly for a vehicle comprising, in combination:
    a first lateral-view mirror coupled to a base portion, said base portion being coupled to a gripping portion;
    wherein said gripping portion of said first lateral-view convex mirror being adapted to be coupled to a top surface of a rear portion of a vehicle between a center portion of said top surface and a driver's side of said top surface;
    wherein said first lateral-view mirror being dimensioned to be positioned in a line of sight with a rear-view mirror, said first lateral-view mirror being dimensioned to allow a driver to view objects positioned lateral to said driver's side of a rear portion of said vehicle by looking at a reflection of said objects reflected from said first lateral-view mirror to said rear-view mirror to said driver; and
    a second lateral-view mirror coupled to a base portion, said base portion being coupled to a gripping portion;
    wherein said gripping portion of said second lateral-view convex mirror being adapted to be coupled to a top surface of a rear portion of said vehicle between a center portion of said top surface and a passenger's side of said top surface;
    wherein said second lateral-view mirror being positioned in a line of sight with said rear-view mirror, said second lateral-view mirror being dimensioned to allow a driver to view objects positioned lateral to a passenger's side of a rear portion of said vehicle by looking at a reflection of said objects reflected from said second lateral-view mirror to said rear-view mirror to said driver.

2. The assembly of claim 1 wherein said base portion of said first lateral-view mirror being rotatable relative to said gripping portion of said first lateral-view mirror and said base portion of said second lateral-view mirror being rotatable relative to said gripping portion of said second lateral-view mirror.

3. The assembly of claim 2 further comprising a remote controlled system coupled to said vehicle and having:
    a remote control coupled to an interior portion of said vehicle proximate a driver's side of said vehicle; and
    at least one actuation device coupled to said base portion of at least one of said first lateral-view mirror and said second lateral-view mirror and dimensioned to rotate at least one of said first lateral-view mirror and said second lateral-view mirror relative to said gripping portion of said at least one of said first lateral-view mirror and said second lateral-view mirror when said remote control transmits an actuation signal to at least one first actuation device.

4. The assembly of claim 1 wherein said gripping portion of said first lateral-view mirror and said gripping portion of said second lateral-view mirror are coupled to said top surface of said rear portion of said vehicle during a manufacturing stage of said vehicle.

5. The assembly of claim 1 wherein said base portion of said first lateral-view mirror defines a bore therethrough and said gripping portion of said first lateral-view mirror defines a bore therethrough and said base portion of said first lateral-view mirror being coupled to said gripping portion of said first lateral-view mirror by a screw and wing-nut assembly.

6. The assembly of claim 1 wherein said base portion of said second lateral-view mirror defines a bore therethrough and said gripping portion of said second lateral-view mirror defines a bore therethrough and said base portion of said second lateral-view mirror being coupled to said gripping portion of said second lateral-view mirror by a screw and wing-nut assembly.

7. The assembly of claim 1 further comprising:
    a first adhesive coupled to a bottom portion of said gripping portion of said first lateral-view mirror and dimensioned to be coupled to said top surface of said rear portion of said vehicle; and a second adhesive coupled to a bottom portion of said gripping portion of said second lateral-view mirror and dimensioned to be coupled to said top surface of said rear portion of said vehicle.

8. The assembly of claim 1 wherein said first lateral-view mirror is convex and has a substantially 40 inch radius of curvature and said second lateral-view mirror is convex and has a substantially 40 inch radius of curvature.

9. The assembly of claim 1 further comprising a substantially rectangular template dimensioned to be placed on a top surface of a rear portion of a vehicle and having a first side and a second side and a top side and a bottom side;

wherein said bottom side of said template being proximate said rear portion of said vehicle and a center portion of said bottom side of said template being proximate a center portion of said rear portion of said vehicle;

wherein said first side of said template is between a center portion of said top surface of said rear portion of said vehicle and a driver's side of said top surface of said rear portion of said vehicle so that said first lateral-view mirror can be placed proximate said first side of said template and be in a line of sight with said rear-view mirror;

wherein said second side of said template is between a center portion of said top surface of said rear portion of said vehicle and a passenger's side of said top surface of said rear portion of said vehicle so that said second lateral-view mirror can be placed proximate said second side of said template and be in a line of sight with said rear-view mirror.

10. The assembly of claim 9 wherein a distance between said first end of said template and said second end of said template being in a range of approximately 16–22 inches and wherein a distance between said top end and said bottom end being in a range of approximately 10–18 inches.

11. A method for viewing objects lateral to a rear portion of a vehicle comprising, in combination, the steps of:

providing a first lateral-view mirror coupled to a base portion, said base portion being coupled to a gripping portion;

coupling said gripping portion of said first lateral-view mirror to a top surface of a rear portion of a vehicle between a center portion of said top surface and a driver's side of said top surface;

wherein said first lateral-view mirror being dimensioned to be positioned in a line of sight with a rear-view mirror, said first lateral-view mirror being dimensioned to allow a driver to view objects positioned lateral to said driver's side of a rear portion of said vehicle by looking at a reflection of said objects reflected from said first lateral-view mirror to said rear-view mirror to said driver;

providing a second lateral-view mirror coupled to a base portion, said base portion being coupled to a gripping portion; and coupling said gripping portion of said second lateral-view mirror to a top surface of a rear portion of said vehicle between a center portion of said top surface and a passenger's side of said top surface;

wherein said second lateral-view mirror being positioned in a line of sight with said rear-view mirror, said second lateral-view mirror being dimensioned to allow a driver to view objects positioned lateral to a passenger's side of a rear portion of said vehicle by looking at a reflection of said objects reflected from said second lateral-view mirror to rear-view mirror to said driver.

12. The method of claim 11 further comprising the step of rotating said base portion of said first lateral-view mirror relative to said gripping portion of said first lateral-view mirror and rotating said second lateral-view mirror relative to said gripping portion of said second lateral-view mirror in order to allow a driver to view objects positioned lateral to a rear portion of said vehicle by looking at a reflection of said objects reflected from said first lateral-view mirror and said second lateral-view mirror to said rear-view mirror to said driver.

13. The method of claim 11 further comprising, in combination, the steps of:

providing a remote control coupled to an interior portion of said vehicle proximate a driver's side of said vehicle;

providing a first actuation device coupled to said base portion of said first lateral-view mirror and dimensioned to rotate said first lateral-view mirror relative to said gripping portion of said first lateral-view mirror when said remote control transmits an actuation signal to said first actuation device;

providing a second actuation device coupled to said base portion of said second lateral-view mirror and dimensioned to rotate said second lateral-view mirror relative to said gripping portion of said second lateral-view mirror when said remote control transmits an actuation signal to said second actuation device; and activating said remote control in order to send an actuation signal to said first actuation device and said second actuation device.

14. The method of claim 11 further comprising, in combination, the steps of:

providing a substantially rectangular template having a first side and a second side and a top side and a bottom side;

placing said template on said top surface of a rear portion of said vehicle, said first side of said template being located between a center portion of said top surface of said vehicle and said driver's side of said top surface of said vehicle, said second side of said template being located between said center portion of said top surface of said vehicle and said passenger's side of said top surface of said vehicle, said bottom side of said template being located proximate said rear portion of said vehicle with a center portion of said bottom side of said template proximate a center portion of said rear portion of said vehicle;

placing said first lateral-view mirror proximate said first side of said template in a line of sight with said rear-view mirror;

placing said second lateral-view mirror proximate said second side of said template in a line of sight with said rear-view mirror; and removing said template from said top surface of said rear portion of said vehicle.

15. The method of claim 14 further comprising, in combination, the steps of:

providing a first adhesive having a first side coupled to a bottom portion of said gripping portion of said first lateral-view mirror;

coupling a second side of said first adhesive to said top surface of said rear portion of said vehicle proximate said first side of said template in a line of sight with said rear-view mirror;

providing a second adhesive having a first side coupled to a bottom portion of said gripping portion of said second lateral-view mirror; and coupling a second side of said second adhesive to said top surface of said rear portion of said vehicle proximate said second side of said template in a line of sight with said rear-view mirror.

16. The method of claim 14 wherein a distance between said first end of said template and said second end of said template being in a range of approximately 16–22 inches and wherein a distance between said top end and said bottom end being in a range of approximately 10–18 inches.

17. The method of claim 11 further comprising, in combination, the steps of:
   providing a first screw and wing-nut assembly, wherein said base portion of said first lateral-view mirror defines a bore therethough dimensioned to receive a screw and said gripping portion of said first lateral-view mirror defines a bore therethrough dimensioned to receive a screw;
   providing a second screw and wing-nut assembly, wherein said base portion of said second lateral-view mirror defines a bore therethough dimensioned to receive a screw and said gripping portion of said second lateral-view mirror defines a bore therethrough dimensioned to receive a screw;
   coupling said base portion of said first lateral-view mirror to said gripping portion of said first lateral-view mirror with said screw and wing-nut assembly; and
   coupling said base portion of said second lateral-view mirror to said gripping portion of said second lateral-view mirror with said screw and wing-nut assembly.

18. The method of claim 11 further comprising, in combination, the steps of:
   providing a first adhesive having a first side coupled to a bottom portion of said gripping portion of said first lateral-view mirror;
   coupling a second side of said first adhesive to said top surface of said rear portion of said vehicle between a center portion of said top surface of said rear portion of said vehicle and a driver's side of said top surface of said rear portion of said vehicle;
   providing a second adhesive having a first side coupled to a bottom portion of said gripping portion of said second lateral-view mirror; and
   coupling a second side of said second adhesive to said top surface of said rear portion of said vehicle between a center portion of said top surface of said rear portion of said vehicle and a passenger's side of said top surface of said rear portion of said vehicle.

19. The method of claim 11 wherein said first lateral-view mirror is convex and has a substantially 40 inch radius of curvature and said second lateral-view mirror is convex and has a substantially 40 inch radius of curvature.

* * * * *